United States Patent [19]
Gaenzler et al.

[11] 3,923,883
[45] Dec. 2, 1975

[54] METHOD FOR THE OXYCARBONYLATION OF OLEFINS

[75] Inventors: Wolfgang Gaenzler, Darmstadt-Eberstadt; Klaus Kabs, Seeheim; Guenter Schroeder, Ober-Ramstadt, all of Germany

[73] Assignee: Rohm GmbH, Darmstadt, Germany

[22] Filed: May 8, 1974

[21] Appl. No.: 468,064

Related U.S. Application Data

[63] Continuation-in-part of Ser. No. 437,201, Jan. 28, 1974, abandoned, which is a continuation-in-part of Ser. No. 382,378, July 25, 1973, abandoned.

[30] Foreign Application Priority Data
May 12, 1973  Germany............................ 2324132

[52] U.S. Cl.......... 260/533 A; 260/515 R; 252/437; 252/441; 252/442; 252/463; 252/464; 252/465; 252/467; 252/468; 252/469; 252/471; 252/475

[51] Int. Cl.²..................... C07C 51/14; C07C 57/04

[58] Field of Search................................ 260/533 A

[56] References Cited
OTHER PUBLICATIONS
Fenton, Chem. Tech., (1972), pp. 220–225.
Fenton et al., Chem. Tech., April, 1972, pp. 220–225.
Davenport et al., I & E. C., 60, No. 11, Nov., 1968, pp. 10–19.

*Primary Examiner*—Lorraine A. Weinberger
*Assistant Examiner*—Richard D. Kelly
*Attorney, Agent, or Firm*—Curtis, Morris & Safford

[57] ABSTRACT

An improved method for the oxycarbonylation of olefins to form the corresponding $\alpha,\beta$-unsaturated carboxylic acids utilizing a catalyst system consisting essentially of A) at least one compound of aluminum, silicon, phosphorus, or gallium, or of an alkaline earth metal and B) at least one compound of iron or copper or of an element of side Groups IV B to VII B of the Periodic System having an atomic weight up to 184.

18 Claims, No Drawings

METHOD FOR THE OXYCARBONYLATION OF OLEFINS

This invention is a continuation-in-part of application Ser. No. 437,201 filed Jan. 28, 1974, which in turn is a continuation-in-part of application Ser. No. 382,378 filed July 25, 1973, both now abandoned.

The present invention relates to a process for the production of $\alpha,\beta$-unsaturated aliphatic carboxylic acids by oxycarbonylation of olefins, i.e., by reacting them with carbon monoxide and oxygen in the presence of catalysts.

Processes are already known in which, for instance, acrylic acid, crotonic acid or methacrylic acid can be prepared in this manner. In accordance with DOS (Unexamined Application for German Patent-Deutsche Offenlegungsschrift) 14 93 375 published Apr. 10, 1969, metals of the platinum group or their compounds are useful as catalysts. Halogen-containing compounds are added as solubilizers, for instance ammonium or alkali chlorides or bromides or lithium-chloride, and to regenerate the noble metal catalyst, compounds of copper, iron, manganese, cobalt, mercury, nickel, cerium, chromium, molybdenum or vanadium are added, i.e., compounds of metals having a higher oxidation potential than that of metallic platinum. Palladium chloride in combination with lithium chloride and copper chloride is considered the preferred catalyst system. It is used, for instance, in glacial acetic acid as solvent for the oxycarbonylation of ethylene, acrylic acid and the $\beta$-acetoxy propionic acid produced therefrom by the addition of acetic acid being obtained. The $\beta$-acetoxy propionic acid can be split by heat back into acrylic acid and acetic acid. Upon the corresponding reaction of propylene, crotonic acid is produced as main product and in addition also some methacrylic acid.

There are a number of practical disadvantages to this process. Thus, for instance, the palladium used as catalyst is not only very expensive, but it is also difficult to recover it from spent catalysts. In particular, the separation of the palladium from copper and other heavy metals affords considerable difficulties. Another disadvantage occurs in connection with the reaction of propylene. Crotonic acid is formed in much greater quantity than the technically more important methacrylic acid. Although crotonic acid is a valuable starting material for various processes, it is nevertheless not possible to process as large quantities thereof as would be produced in the industrial synthesis of methacrylic acid by the process described.

In accordance with the present invention, $\alpha,\beta$-unsaturated aliphatic carboxylic acids are prepared from the corresponding olefins, carbon monoxide and oxygen in liquid phase in the absence of water and in the presence of a catalyst in which there is employed as catalyst in each case at least one compound soluble in the fluid used as liquid phase, selected from the groups:

A. Compounds of aluminum, silicon, phosphorus, gallium, or of the alkaline earth metals, B. Compounds of iron, copper, or of elements of the side Groups IVB to VIIB of the Periodic System having atomic weights up to 184.

It is believed that the compounds used as catalysts form multi-nuclear complexes which act by homogeneous catalysis in the process of the invention. No details are as yet known as to the structure of the complexes, but there is undoubtedly a fundamental difference from the catalysts used in the process of DOS 14 93 375, since the known process uses heavy metal compounds of higher oxidation potential than metallic platinum or other oxidizing agents or halogen compounds, together with the oxygen present in the reaction mixture, in order to regenerate the platinum-metal catalysts, i.e., bring them into a state of oxidation in which they react with the olefins, whereby they themselves are reduced. The metallic platinum is brought back to its original high valency stage by the oxidative heavy metal compounds. The mechanism has been described in detail by Fenton and Olivier (Chemtech 1972, pp. 220 – 225).

Accordingly, in the known systems, the heavy metals are not essential for the actual oxidative carbonylation of the olefins, but can be replaced by other strong oxidizing agents such as nitrogen oxides.

As compared with this, in the process of the invention, no platinum metal together with heavy metals or some other pair of heavy metals of different oxidation potential is present, but in addition to the elements of the side Groups IVB to VIIB, elements are used which occur in their compounds in only one valency stage. It is therefore to be assumed that in the process of the invention an entirely new catalyst system enters into action in which both components are essential. Without attempting to limit the invention to any one theory, the elements of group A appear to be ones having a small ion radius and correspondingly high ion potential and the elements of group B are elements having different valency stages. The assumption that multi-nuclear complexes are produced with ions of the different groups, in which complexes olefin molecules and carbonyls occur as ligands, appears justified. Strangely enough, however, catalytic activity is possessed, not only by the lowest valency stages of the participating transition metals whose ability to form carbonyl complexes is particularly pronounced, but also by the higher valency stages. Although all catalyst compositions in accordance with the invention are composed in accordance with the same basic principle, they are by no means the same as or indiscriminately interchangeable with each other. The optimum reaction conditions, the required temperatures and pressures and the reaction velocities differ somewhat from system to system. This, however, constitutes specifically one of the advantages of the invention, namely that one is not limited in each case to the same reaction conditions. Due to the great diversity of possibilities, the advantages of the process of the invention over the known processes lie in entirely different fields, i.e. the same advantages are not obtained in every possible synthesis. The most important advantages obtainable are:

1. Different isomeric unsaturated carboxylic acids can be prepared from asymmetric olefins with high selectivity by means of different catalyst compositions.

2. Instead of the very expensive platinum-metal catalysts, cheap metal compounds, for instance aluminum and manganese compounds, can be used.

3. The difficult purification of spent catalyst which is absolutely necessary in the case of platinum metals can be dispensed with here. If such a purification is necessary, it is generally rather simple.

4. High space-time yields can be obtained.

5. In some instances one can operate at low pressures and/or low temperatures.

6. One can select catalyst systems in which there are not produced any by-products which are difficult to separate from the main product, such as, for instance, isobutyric acid together with methacrylic acid.

The olefins that are useful in the process of the invention are olefins which have at least one hydrogen atom on the carbon atoms participating in the double bond. Such olefins are, for instance, ethylene, propylene, butylene, isobutylene, pentene-1, hexene-1, butadiene, isoprene, styrene, vinyl toluene, etc., of which ethylene and propylene are the most important.

Carbon monoxide and oxygen can be used in principle in accordance with the reaction equation:

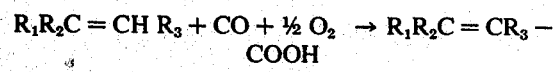

$$R_1R_2C = CH R_3 + CO + \tfrac{1}{2} O_2 \rightarrow R_1R_2C = CR_3 - COOH$$

in which $R_1$, $R_2$, $R_3$ are hydrogen atoms or hydrocarbon radicals. The carbon monoxide and oxygen are ordinarily supplied in stoichiometric quantity ratios with respect to the olefin, but this is not always advisable, and carbon monoxide is frequently used in excess. The olefin can also be present in excess. In order to avoid the formation of explosive mixtures, oxygen is preferably fed continuously as it is consumed, even if the process itself is not carried out fully continuously. Oxygen can be used both in pure form and in the form of air.

The aforementioned equation shows that the formation of $\alpha,\beta$-unsaturated carboxylic acid is favored by the application of pressure, and the use of pressure is also indicated if only for maintenance of liquid phase conditions. Therefore, the reaction is preferably carried out under pressure, advantageously under a pressure of from 1 - 200 atmospheres gauge even if the oxycarbonylation of olefins in the presence of the catalysts of the invention occurs or is initiated at normal pressures.

The reaction medium and the catalyst components are so adapted to each other that at least a catalytically active quantity of the compounds can pass into solution. Due to the fundamentally strong polar nature of the metal compounds, strongly polar anhydrous liquids enter particularly into consideration. There are preferably employed aliphatic carboxylic acids such as acetic acid, propionic acid or crotonic acid. Other suitable organic liquids are formamide, mono- and dimethyl formamide, acetamide, N-substituted acetamides, acetone, methyl ethyl ketone, cyclohexanone, dimethyl carbonate, methyl formate, diethyl oxalate, of which the less polar liquids are used primarily in admixture with more strongly polar liquids, particularly when the metal compounds are particularly strongly polar. Certain organic liquids, such as, for instance, acetyl acetone, dimethyl formamide, dimethyl sulfoxide or hexamethyl phosphoryl triamide, themselves exert a complexing action and can detrimentally affect the course of the reaction, for which reason their suitability must be carefully checked in each individual case.

The liquid reaction medium is advantageously so selected that it can be easily separated — in particular by distillation — from the $\alpha,\beta$-unsaturated carboxylic acid formed. Therefore, low-boiling liquds are preferably used for the production of high-boiling carboxylic acids, and vice versa. However, the acid which is to be produced can itself be used as reaction medium, thereby avoiding all problems as to separation, i.e., acrylic acid for the oxycarbonylation of ethylene, or methacrylic acid for the oxycarbonylation of propylene.

In order to carry out the process in anhydrous form, it is not sufficient merely to use all the reactants in anhydrous form. Small quantities of water can be formed by side reaction and then disturb the course of the reaction. In this respect the process of the invention has certain similarities to the process in accordance with DOS 14 93 375. In the latter, various possibilities are indicated for the removal of water from the reaction mixture, which possibilities can also be employed in the present process. This includes, in particular, the addition of compounds which react with water, for instance the acid anhydrides or acid chlorides of the carboxylic acids to be produced or used as organic medium, or the use of molecular sieves.

The compounds used as catalyst should, as mentioned above, be at least of limited solubility in the reaction medium. However, they can also pass into solution by chemical reaction; for instance metal oxides or hydroxides which pass into the corresponding acetates in acetic acid can be employed. It is sufficient for a catalytically active quantity of the compounds to pass in solution at the reaction temperature, possibly merely in the presence of all other reactants, while the solubility at room temperature in the pure organic liquid may be any desired. If the catalytically active complex is not present in dissolved form in the reaction mixture, it must have at least formed from the dissolved components. The catalyst components are in general added in an amount of 0.01 to 5 percent by weight, referred to the liquid medium. If the quantity of catalyst is too small or the solubility too low, an unsatisfactory space-time yield is obtained.

Suitable components are, for instance, the chlorides, bromides, chlorates, nitrates, carbonates, hydroxides, oxides, formates, acetates, benzoates, phthalates, picrates, acetyl acetonates, etc. Salts free of water of crystallization are in principle preferred. The carbonyls and complexing agents of the elements can also be used provided that the complexes are not more stable than the catalytically active complexes. Organometallic compounds can also be used in many cases, although they are not preferred because of their high price. It may be advantageous to contact the compounds for a prolonged time with the reaction medium and possibly heat them before the start of the reaction. Once the active complexes have been formed, the catalysts will not be modified for a prolonged time. It has even been observed that the activity and selectivity increase further upon prolonged operation. Nevertheless it is advantageous to replace the catalyst now and then or continuously because of the unavoidable entrance of impurities.

Among the compounds of catalyst component A, the compounds of aluminum are preferred. They lead to high yields, and in the case of $\alpha$-olefins, promote oxycarbonylation in the 2-position. Anhydrous aluminum chloride or aluminum acetate is advantageously employed. When carboxylic acids are used as reaction medium, even unaged aluminum hydroxide can be used. Compounds of beryllium have similar catalytic properties but are not generally used due to their high toxicity. Among the alkaline earth metals, magnesium and calcium in the form of their chlorides, hydroxides, oxides, carbonates or acetates may be used to advantage. The heavier alkaline earth metal ions, i.e., strontium and barium, are not as effective, this being presumably due to their substantially greater ionic radii.

For catalyst component B, the compounds that are useful are those of iron, copper, and of the elements of Groups IVB to VIIB of the Periodic System, i.e., compounds of titanium, zirconium, hafnium, vanadium, niobium, tantalum, chromium, molybdenum, tungsten and manganese. They are preferably employed in the form of the anhydrous chlorides or soluble complex compounds. Of the side-group elements, the compounds of manganese, tungsten and molybdenum are particularly preferred.

Particularly preferred catalyst combinations are those in which compounds of catalyst component A (compounds of aluminum, silicon, phosphorus, gallium, and the alkaline earth metals) are combined with compounds of iron and copper.

Among the catalysts to be employed according to the invention, those which comprise a titanium compound and a phosphorus compound or an aluminum compound and a copper compound or a silicon compound and an iron compound have proved particularly advantageous for the oxycarbonylation of propylene for the formation of methacrylic acid. The preparation of suitable catalysts of this type is described in more detail in the Examples. As silicon compounds, silicon tetrachloride is principally employed. As a compound of phosphorus, phosphorus chloride or oxychloride is used. As compounds of gallium, the halides, again, are employed. Iron and copper can be employed in the form of their halides, sulfates, carboxylates, oxides, or complex salts, either alone or in admixture with each other, for preparation of the catalyst complex.

The molar ratio of the components A and B should in general lie between 1:10 and 10:1, but ratios which are closer to a ratio of 1:1 generally have greater activity, so that the range between 1:3 and 3:1 is preferred. If several compounds derived from different elements are used for one catalyst component, the sum of their molar fractions is used in the ratio.

It has already been pointed out that different combinations of components A and B may have rather different properties and accordingly are used under different conditions. Thus certain combinations require pressures of the reaction gases of up to 200 atm., while others are active even at normal pressure. To be sure, the space-time yield is generally improved by operation under pressure. Catalyst combinations which give a high conversion and selectivity at moderate pressures, for instance of 5 to 15 atm., are particularly interesting from a technological standpoint. Aluminum/tungsten-VI may be mentioned as example of one such system.

The same is true of the reaction temperatures. While a few systems permit reactions at room temperature or moderately elevated temperature, others are active only at 150° to 300°C. In most cases, temperatures within the range of 80° to 200°C. are most favorable.

In contradistinction to the conversion of ethylene in which acrylic acid is produced as sole oxycarbonylation product, it is necessary for the production of methacrylic acid from propylene to select conditions under which the formation of the isomeric crotonic acid is suppressed as far as possible. Catalyst systems consisting of aluminum or beryllium on the one hand and manganese, molybdenum or tungsten on the other hand promote the formation of methacrylic acid. The ratio of methacrylic acid to crotonic acid is in the most favorable cases 10:1 or more.

In principle, it is possible and furthermore advisable for the testing of catalyst systems to carry the process out batchwise by charging an autoclave with a liquid medium containing catalyst, introducing the reaction gases under pressure and heating to reaction temperature. However, a fully continuous operation is preferred for the carrying out of the process of the invention on an industrial scale.

In this case the liquid phase is intimately contacted in a reactor with the gaseous starting substances, a part of the liquid phase is continuously removed, and the unsaturated acid is isolated in known manner, whereupon the catalyst-containing reaction medium is returned to the reactor. The gaseous phase need not necessarily be recycled, since the reaction product remains in the liquid phase. To be sure, it will also be necessary continuously to replace a part of the gaseous phase in order to remove entrained foreign gases such as nitrogen or carbon dioxide.

In the oxycarbonylation of ethylene, various by-products can be produced in different proportions in addition to acrylic acid, namely β-acetoxy propionic acid, which can easily be split by heat into acrylic acid and acetic acid, as well as propionic acid. In the production of methacrylic acid, it is possible for β-acetoxy-n-butyric acid and isobutyric acid to be produced in addition to its isomer, crotonic acid. These by-products may be of interest as intermediates for organic syntheses. The removal of the by-products from the acrylic or methacrylic acid is difficult due to the high boiling points and entails the risk of polymerization. Since an esterification of the acids with low alcohols to form low acrylic and methacrylic acid esters which are of great industrial importance for the manufacture of vinyl polymers is in any event generally intended, it is advisable to distill the resultant acid mixture in vacuum without carrying out any measures of separation, then esterifying the distillate in known manner, and only then subjecting the esters which are of substantially lower boiling point to a careful fractional distillation for their purification.

In the examples described below, the following procedure was employed:

The reaction medium with glacial acetic acid as solvent, acetic anhydride as water-combining agent, and the catalyst mixture were introduced into a "Teflon"-coated heatable 2-liter autoclave. Thereupon the autoclave was closed. The olefin was then introduced under pressure into the autoclave. Ethylene was introduced until a pressure of 40 atm.ga. was obtained. Propylene had to be introduced several times due to its low liquefaction pressure of about 10 atm.ga. in order to obtain saturation of the reaction medium. Thereupon carbon monoxide and oxygen were added under pressure and the autoclave was heated to 100° – 160°C., the reaction then taking place.

The contents of the autoclave were separated by distillation. In the oxycarbonylation of ethylene, the acrylic acid which has been formed passed over at a top temperature of 140°C., while with the reaction of propylene, crotonic acid and methacrylic acid were removed in vacuum at temperatures between 80° and 100°C. The crotonic acid solidified in a cooled receiver (melting point 72°C.).

The reaction products formed were analyzed in known manner by gas chromatography, by determination of the bromine number, by the taking of the IR spectrum and the magnetic nuclear resonance spectrum.

EXAMPLE 1

5 g of manganous chloride and 5 g of aluminum acetate were dissolved in 500 ml of glacial acetic acid and 10 ml of acetanhydride. After saturation with propylene, 80 atm.ga. carbon monoxide and 20 atm.ga. oxygen were introduced, whereupon heating was effected to 125°C. 5.9 g of methacrylic acid and traces of isobutyric acid were formed.

EXAMPLE 2

3 g of tungsten hexachloride and 1 g of aluminum chloride were heated to 320°C. in a stream of nitrogen. After cooling, the reaction mass was dissolved in 450 ml of glacial acetic acid and 5 ml of acetanhydride and 1.0 g of sodium acetate were also added. After saturation with propylene, 80 atm.ga. carbon monoxide and 20 atm.ga. oxygen were introduced, and heating was effected to 125°C. 5.8 g of methacrylic acid and 1.25 g of crotonic acid as well as traces of isobutyric acid were found.

EXAMPLE 3

2 g of tungsten oxytetrachloride, 2 g of aluminum chloride and 2 g of sodium acetate were dissolved in 500 ml of glacial acetic acid and 5 ml of acetanhydride. After saturation with propylene and introduction of carbon monoxide and oxygen under the conditions described in Example 2, 11.2 g of methacrylic acid, 6.4 g of crotonic acid and 1.5 g of isobutyric acid were obtained.

EXAMPLE 4

2 g of tungsten hexachloride and 0.8 g of beryllium chloride were dissolved in 500 ml of glacial acetic acid and 10 ml of acetanhydride. Otherwise, the same procedure was used as in Example 2. 4.1 g of methacrylic acid, 0.9 g of crotonic acid and 1 g of isobutyric acid were obtained.

EXAMPLE 5

2 g of titanium tetrachloride were added drop by drop to a solution of 5 g of aluminum acetate in 450 ml of glacial acetic acid and 50 ml of acetanhydride. The resultant yellow reaction solution was utilized in the same manner as in Example 2. Methacrylic acid and isobutyric acid were formed.

EXAMPLE 6

1 g of vanadium (III) chloride and 2 g of magnesium chloride are dissolved in a mixture of 450 ml of glacial acetic acid and 50 ml of acetic anhydride. This catalyst solution is placed into a 2 liter autoclave, is saturated with propylene, then pressurized with 80 atmospheres of carbon monoxide and 25 atmospheres of air to a total pressure of 115 atmospheres, and heated to 150°C. Workup yielded 5.4 g of crotonic acid and a small quantity of methacrylic acid.

EXAMPLE 7

A titanium (IV)-acetylacetonate-complex is prepared in glacial acetic acid according to Dilthey [Chem. Ber. 37, 588 (1904)]. 3 g of this complex are dissolved in a mixture of 640 ml of glacial acetic acid and 10 ml of acetic anhydride. 3 g of aluminum (III) acetate and 5 g of potassium bromide are added to this solution.

This catalyst solution is saturated with propylene in a 2 liter autoclave lined with "Teflon," pressurized with 80 atmospheres of carbon monoxide and 20 atmospheres of oxygen, and heated to 150°C. The reaction yielded
  5.3 g of crotonic and
  0.8 g of methacrylic acid.

EXAMPLE 8

In analogy to the procedure of Dilthey mentioned in Example 7, a polynuclear titanium-aluminum-acetylacetonate-complex is formed starting from aluminum (III) chloride, titanium (IV) chloride, and acetylacetone.

2 g of this complex are dissolved in a mixture of 650 ml of glacial acetic acid and 50 ml of acetic anhydride. The reaction is carried out as described in Example 7.
  17.7 g of crotonic and
  1 g of methacrylic acid could be isolated.

EXAMPLES 9 to 12

Two catalyst components A and B, as listed in the following Table, are dissolved in a mixture of 650 ml of glacial acetic acid and 50 ml of acetic anhydride. In each case, this solution is subjected to the same reaction conditions as described in Example 7. The yields of crotonic acid and methacrylic acid formed are listed as well.

TABLE

| Example | Catalyst (in g) Component A | | Component B | | Yield (in g) of Crotonic Acid | Yield (in g) of Methacrylic Acid |
|---|---|---|---|---|---|---|
| 9  | Ca(OAc)$_2$  | (2) | TaCl$_5$   | (0.8) | 2.1 | nil |
| 10 | Al(OAc)$_3$  | (2) | TaCl$_5$   | (1)   | 1.5 | 0.5 |
| 11 | Al(OAc)$_3$  | (2) | MoCl$_5$   | (1)   | 1.5 | nil |
| 12 | AlCl$_3$     | (2) | VO(OAc)$_3$| (1)   | 1   | 0.5 |

[(OAc) stands for the acetate ion]

EXAMPLE 13

3 g of acetyl acetone are dissolved in 25 ml of glacial acetic acid and combined successively with 2.2 g of phosphorus pentachloride and 1.4 g of titanium tetrachloride. The precipitated crystals are vacuum-filtered and washed with a small amount of cold glacial acetic acid. The titanium-phosphorus complex so formed is dissolved in 475 ml of glacial acetic acid and combined with a further 25 ml of acetic acid anhydride. The reaction solution is introduced into a high pressure autoclave, saturated with propylene, and then combined with 80 atmospheres of carbon monoxide and 20 atmospheres of oxygen and heated to about 150°C. At this temperature, the pressure begins to fall slowly. After cooling and opening, the following products are obtained by distillation:
  4.7 g of 1,2-propanediol diacetate,
  0.4 g of methacrylic acid,
  3.3 g of crotonic acid, and
  15.6 g of β-acetoxy-n-butyric acid.

EXAMPLE 14

2 g of copper-II-chloride and 2 g of aluminum acetate are dissolved in 490 ml of glacial acetic acid and 10 ml of acetic acid anhydride. After saturation with propylene, 20 atmospheres of oxygen and 80 atmospheres of carbon monoxide are introduced under pressure and the autoclave is heated to 153°C. At this temperature, the pressure falls from 156 atmospheres to about 136 atmospheres. Distillative treatment gave:
  3 g of propylene glycol diacetate,
  0.4 g of methacrylic acid, 4.8 g of crotonic acid, and
15.9 g of β-acetoxy-n-butyric acid.

EXAMPLE 15

A complex is formed, as in Example 13, from 3.0 g of acetyl acetone, 1.7 g of silicon tetrachloride, and 2.4 g of iron-III-chloride in glacial acetic acid [cf. Chemische Berichte 37, 589 (1904)]. The total reaction solution is dissolved in 450 ml of glacial acetic acid and 50 ml of acetic anhydride and then treated with propylene, carbon monoxide, and oxygen as in Example 14. The reaction mixture is heated to about 140°C. The pressure falls from 161 atmospheres to 123 atmospheres at this temperature. After cooling and opening the autoclave, the following are obtained by distillation:

0.5 g of methacrylic acid,
11.1 g of crotonic acid,
2.3 g of β-acetoxy-n-butyric acid, and
8.5 g of 1,2-propanediol diacetate

EXAMPLE 16

3 g of titanium-III-acetylacetonate prepared from titanium (III) chloride and acetylacetone in toluene [cf. Helvetica Chemica Acta 51, 601 (1968)], 2 g of potassium bromide, and 5 g of gallium-III-chloride are dissolved in 450 ml of glacial acetic acid and 50 ml of acetic acid anhydride. Propylene, carbon monoxide, and oxygen are introduced as in the previous Examples and the mixture is then heated to 165°C. On doing so, the pressure falls from a maximum of 136 atmospheres to 104 atmospheres. After cooling, the following are recovered by distillation:

0.7 g of methacrylic acid,
9.4 g of crotonic acid,
16.1 g of β-acetoxy-n-butyric acid, and
6.6 g of 1,2-propanediol diacetate.

EXAMPLE 17

3 g of manganese-II-chloride, 2 g of iron-III-chloride, 4 g of aluminum acetate, and 3 g of silicon tetrachloride are dissolved in 500 ml of glacial acetic acid and 15 ml of acetic acid anhydride. As described in Example 13, 20 atmospheres of oxygen and 80 atmospheres of carbon monoxide are introduced into the catalyst solution in an autoclave after prior saturation with propylene, and then the mixture is heated to 160°C. At this temperature, a clear decrease in the original pressure is observed. After cooling and opening, the autoclave contents are worked up by distillation and analyzed as indicated. The following are found:

9.8 g of crotonic acid,
2.0 g of β-acetoxy-n-butyric acid,
1.1 g of methacrylic acid, and
12.3 g of 1,2-propanediol diacetate.

EXAMPLE 18

Copper-I-iodide-trimethylphosphite is formed in 28 ml of benzene from 2.6 g of copper-I-iodide and 1.7 g of trimethylphosphite. The white crystalline substance obtained after concentration is dissolved in 600 ml of glacial acetic acid. Then 10 atmospheres of propylene, 40 atmospheres of air, and 60 atomspheres of carbon monoxide are introduced under pressure and the system is heated for several hours at 160°C. Working-up gives 2.5 g of crotonic acid.

EXAMPLE 19

3 g of bis-triphenylphosphinoxide-copper-II-chloride (prepared from triphenylphosphinoxide and copper-II-chloride in ethanol) and 5 g of magnesium chloride are dissolved in a mixture of 700 ml of glacial acetic acid and 100 ml of acetic anhydride. Then 40 atmospheres of ethylene, 40 atmospheres of carbon monoxide, and 40 atmospheres of air are introduced under pressure and the system is heated to 170° for several hours. Working up gives 1.5 g of acrylic acid and 4.0 g of ethylene glycol diacetate.

What is claimed is:

1. In the method for preparing α,β-unsaturated carboxylic acids by the oxidative carbonylation of an α-olefin with oxygen and carbon monoxide, in a substantially non-aqueous reaction medium in the presence of a catalytic amount of a catalyst soluble in said non-aqueous medium, the improvement wherein said catalyst consists essentially of a mixture of:
   A. at least one compound of aluminum, silicon, phosphorus, or gallium, or of an alkaline earth metal, and
   B. at least one compound of iron, copper, or of a metal of Groups IV B to VII B having an atomic weight up to 184.

2. The method defined in claim 1 wherein said catalyst consists essentially of a mixture of:
   A. at least one compound of aluminum, silicon, phosphorus, or gallium, or of an alkaline earth metal, and
   B. at least one compound of iron or copper.

3. The method defined in claim 1 wherein catalyst component A is selected from the group consisting of aluminum chloride, aluminum acetate, beryllium chloride, and the chlorides, hydroxides, oxides, carbonates and acetates of magnesium and calcium.

4. The method defined in claim 1 wherein catalyst component A is a compound of aluminum, beryllium, magnesium or calcium.

5. The method defined in claim 1 wherein catalyst component B is a compound of titanium, vanadium, tantalum, molybdenum, tungsten, or manganese.

6. The method defined in claim 1 wherein catalyst component A is an aluminum compound.

7. The method defined in claim 1 wherein catalyst component A is anhydrous aluminum chloride or aluminum acetate.

8. The method as defined in claim 1 wherein catalyst component B is a compound of titanium, zirconium, hafnium, vanadium, niobium, tantalum, chromium, molybdenum, tungsten or manganese.

9. The method defined in claim 8 wherein catalyst component B is an anhydrous chloride or a complex compound soluble in the reaction medium.

10. The method defined in claim 8 wherein catalyst component B is an anhydrous chloride of manganese, tungsten, molybdenum or titanium.

11. The method defined in claim 1 wherein the relative molar proportions of catalyst components A and B are from 1:10 to 10:1.

12. The method defined in claim 1 wherein the relative molar proportions of catalyst components A and B are from 1:3 to 3:1.

13. The method defined in claim 1 wherein the olefin is ethylene, propylene, butylene, isobutylene, pentene-1, hexene-1, butadiene, isoprene, styrene or vinyl toluene.

14. The method defined in claim 1 wherein the olefin is ethylene.

15. The method defined in claim 1 wherein the olefin is propylene.

16. The method defined in claim 1 wherein said catalyst is formed between a phosphorus compound and a titanium compound.

17. The method defined in claim 1 wherein said catalyst is formed between an aluminum compound and a copper compound.

18. The method defined in claim 1 wherein said catalyst is formed between a silicon compound and an iron compound.

* * * * *

UNITED STATES PATENT AND TRADEMARK OFFICE
CERTIFICATE OF CORRECTION

PATENT NO. : 3,923,883
DATED : December 2, 1975
INVENTOR(S) : Gaenzler et al.

It is certified that error appears in the above–identified patent and that said Letters Patent are hereby corrected as shown below:

In the Heading:

After Item "[30] Foreign Application Priority Data," the following should be inserted:

July 31, 1972        Germany........P 22 37 590

*Signed and Sealed this*

*second* Day of *March 1976*

[SEAL]

*Attest:*

RUTH C. MASON
*Attesting Officer*

C. MARSHALL DANN
*Commissioner of Patents and Trademarks*